United States Patent
Ahmed et al.

(10) Patent No.: US 10,683,923 B2
(45) Date of Patent: Jun. 16, 2020

(54) ROTATABLE BODY VALVE STEM CONTACT FOR SWITCHABLE ROLLER FINGER FOLLOWER

(71) Applicant: Schaeffler Technologies AG & Co. KG, Herzogenaurach (DE)

(72) Inventors: Faheem Ahmed, Rochester Hills, MI (US); Colin Foster, Belle River (CA)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 57 days.

(21) Appl. No.: 15/664,620

(22) Filed: Jul. 31, 2017

(65) Prior Publication Data

US 2019/0032765 A1     Jan. 31, 2019

(51) Int. Cl.
| | |
|---|---|
| *F16H 53/06* | (2006.01) |
| *F01L 1/18* | (2006.01) |
| *F01L 1/22* | (2006.01) |
| *F01L 1/46* | (2006.01) |
| *F01L 3/00* | (2006.01) |

(52) U.S. Cl.
CPC .............. *F16H 53/06* (2013.01); *F01L 1/185* (2013.01); *F01L 1/22* (2013.01); *F01L 2001/186* (2013.01); *F01L 2001/467* (2013.01); *F01L 2003/11* (2013.01); *F01L 2105/00* (2013.01)

(58) Field of Classification Search
CPC ... F16H 53/06; F01L 1/22; F01L 1/185; F01L 2001/186; F01L 2001/467; F01L 2003/11; F01L 2105/00; F01L 2105/02
USPC .......... 123/90.44, 90.15–90.17, 90.39, 90.45
See application file for complete search history.

(56) References Cited

U.S. PATENT DOCUMENTS

| | | |
|---|---|---|
| 5,655,490 A | 8/1997 | Nagano et al. |
| 5,806,475 A | 9/1998 | Hausknecht |
| 6,138,625 A | 10/2000 | Garrison |
| 6,138,626 A | 10/2000 | Speil |
| 6,612,276 B2 | 9/2003 | Cecur |
| 6,769,387 B2 | 8/2004 | Hayman et al. |
| 6,889,644 B2 | 5/2005 | Ferracin et al. |
| 8,215,275 B2 | 7/2012 | Church |
| 8,627,796 B2 * | 1/2014 | Harman ................ F01L 1/185 123/90.16 |

(Continued)

FOREIGN PATENT DOCUMENTS

| | | |
|---|---|---|
| DE | 19850404 A1 | 5/2000 |
| EP | 2418359 B1 | 9/2013 |

(Continued)

OTHER PUBLICATIONS https://www.hemmings.com/magazine/mus/2012/11/Performance-Rocker-Arms-for-Small-Block-Chevrolets-Part-Two/3718741.html; dated Nov. 2012.

(Continued)

*Primary Examiner* — Devon C Kramer
*Assistant Examiner* — Kelsey L Stanek
(74) *Attorney, Agent, or Firm* — Volpe and Koenig, P.C.

(57) ABSTRACT

A switchable roller finger follower including an improved valve stem pallet formed by a rotatable body is disclosed. The switchable roller finger follower includes an axle extending through first aligned holes of an outer body and second aligned holes of an inner body to pivotally attach the inner body to the outer body at a valve stem end. The rotatable body is mounted on the axle and adapted to contact a valve stem.

7 Claims, 6 Drawing Sheets

(56) References Cited

U.S. PATENT DOCUMENTS

| | | |
|---|---|---|
| 9,115,607 B2 | 8/2015 | Harman |
| 9,140,148 B2 | 9/2015 | Church |
| 2012/0039107 A1 | 2/2012 | Chung |
| 2012/0097123 A1 | 4/2012 | Schulze et al. |
| 2013/0186258 A1* | 7/2013 | Tanaka .................. G09B 15/00 84/465 |
| 2013/0186358 A1* | 7/2013 | Manther ................ F01L 1/185 123/90.44 |
| 2013/0312687 A1* | 11/2013 | Zurface ............... F01L 13/0036 123/90.39 |
| 2018/0058276 A1* | 3/2018 | Radulescu ................ F01L 1/18 |

FOREIGN PATENT DOCUMENTS

| | | | |
|---|---|---|---|
| GB | 214412 | 4/1924 | |
| WO | WO-2005033562 A2 * | 4/2005 | .............. F01L 1/053 |
| WO | 2014071373 A1 | 5/2014 | |
| WO | 2015171688 A1 | 11/2015 | |

OTHER PUBLICATIONS http://rpmspeed.com/98-02-ls1-crane-cams-gold-race-rocker-kit-1-8/?osCsid=381adf5e481f0b60ea28bcb98d325e7f; dated May 16, 2005.
http://www.hotrod.com/articles/camshaft-basic/; dated Dec. 9, 2003.

* cited by examiner

ROTATABLE BODY VALVE STEM CONTACT FOR SWITCHABLE ROLLER FINGER FOLLOWER

FIELD OF INVENTION

This invention is generally related to a switchable roller finger follower, and is more particularly related to a rotatable body for a switchable roller finger follower.

BACKGROUND

Switchable roller finger followers, including an inner body, outer body, lost motion spring, and latching mechanism are well known. For example, known rocker arms and switchable roller finger followers are disclosed in U.S. Pat. Nos. 6,769,387; 6,889,644; 5,655,490; 8,627,796; 9,115,607; 9,140,148; and 8,215,275, U.S. Pubs. 2013/0186358 and 2012/0097123; EP Pub. 2914820; and PCT Pub. WO 2015/171688.

Known switchable roller finger followers are generally relatively expensive to manufacture due to precise design requirements and a relatively high number of sub-components. Switchable roller finger followers also typically have a high mass moment of inertia, which has a detrimental effect on the associated valve train dynamics and loads. Valve stem pallets, i.e. the portion of a switchable roller finger follower that engages an associated valve stem, are typically fixed in position and can experience excessive wear in localized areas.

An improved and compact valve stem pallet would be desirable that does not experience the excessive wear typically experienced by known valve stem pallets, and is less complex to manufacture.

SUMMARY

A switchable roller finger follower including a rotatable body as a valve stem pallet is disclosed. The switchable roller finger follower includes an outer body having a valve stem end, a lash adjuster end, two arms having first aligned holes defined therein at the valve stem end, and an inner space defined in the outer body between the two arms. The switchable roller finger follower includes an inner body positioned in the inner space of the outer body, the inner body having a first end including two inner side walls having second aligned holes defined therein, and a second end adjacent to the lash adjuster end of the outer body. A lost motion spring is located between the inner body and the outer body, and a latching mechanism selectively locks the inner body in a fixed position relative to the outer body. An axle extends through the first aligned holes of the outer body and the second aligned holes of the inner body to pivotally attach the inner body to the outer body at the valve stem end. The rotatable body is mounted on the axle and located between the two inner sidewalls, and the rotatable body is adapted to contact a valve stem.

In one embodiment, the inner body includes downwardly extending guides projecting from the two inner side walls, and the guides are adapted to guide the valve stem.

In another embodiment, a pair of washers are rotatably mounted on the axle on both axial sides of the rotatable body, and the pair of washers are adapted to guide the valve stem Preferred arrangements with one or more features of the invention are described below and in the claims.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Figure 1:
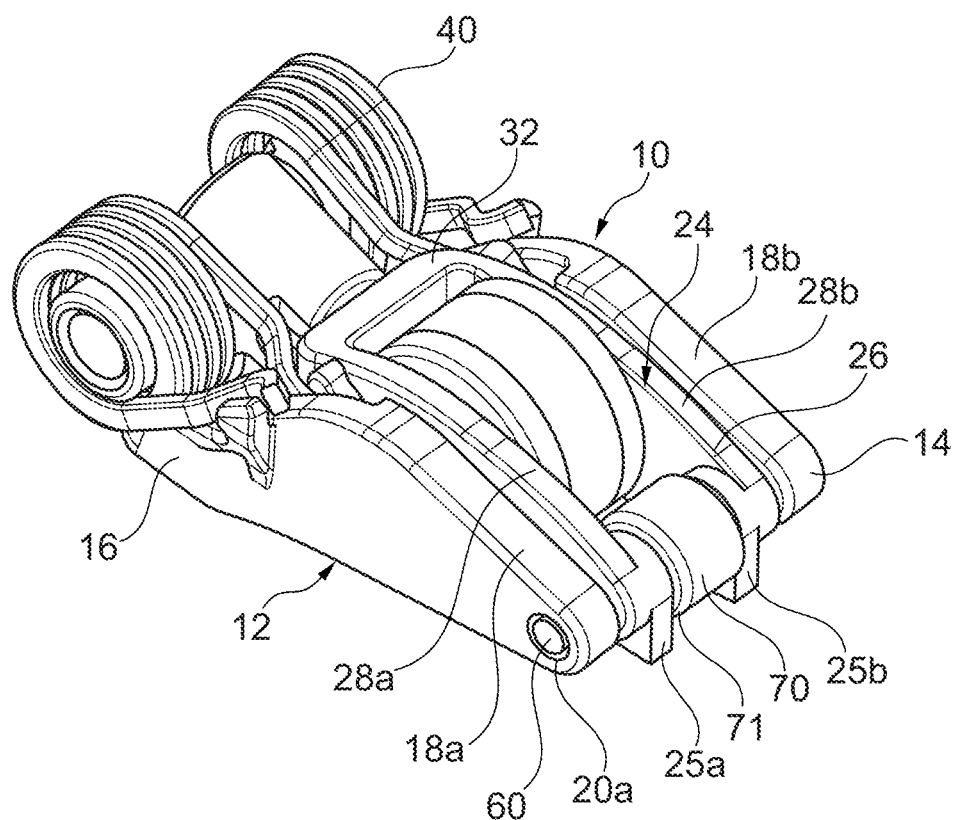
FIG. 1 is a top perspective view of a first embodiment of a switchable roller finger follower.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
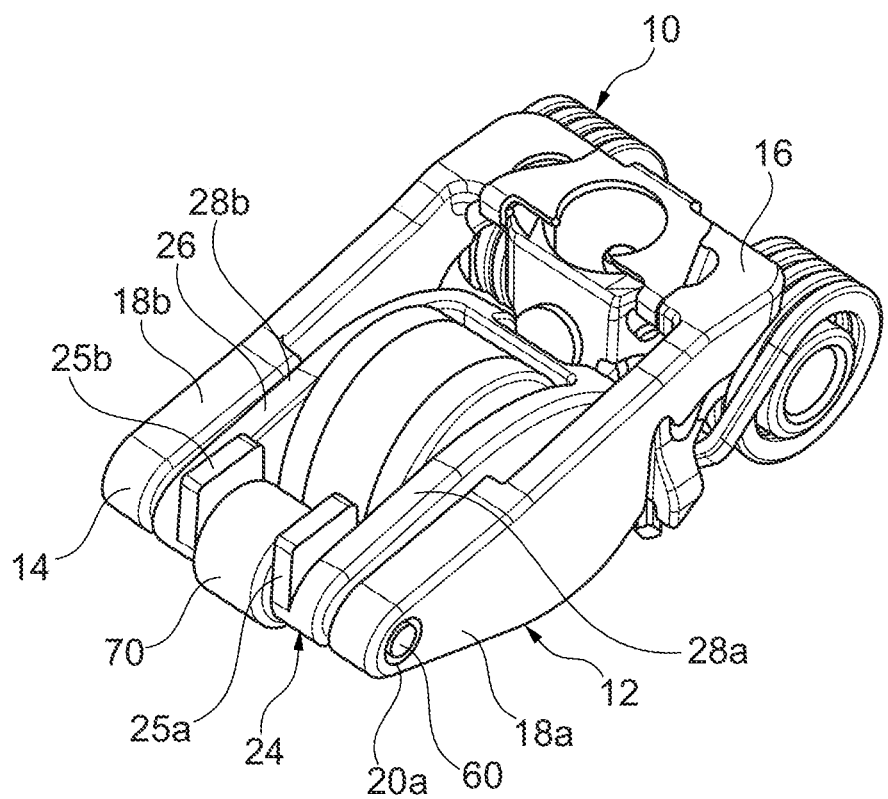
FIG. 2 is a rear perspective view of the first embodiment of the switchable roller finger follower.
Figure 3:
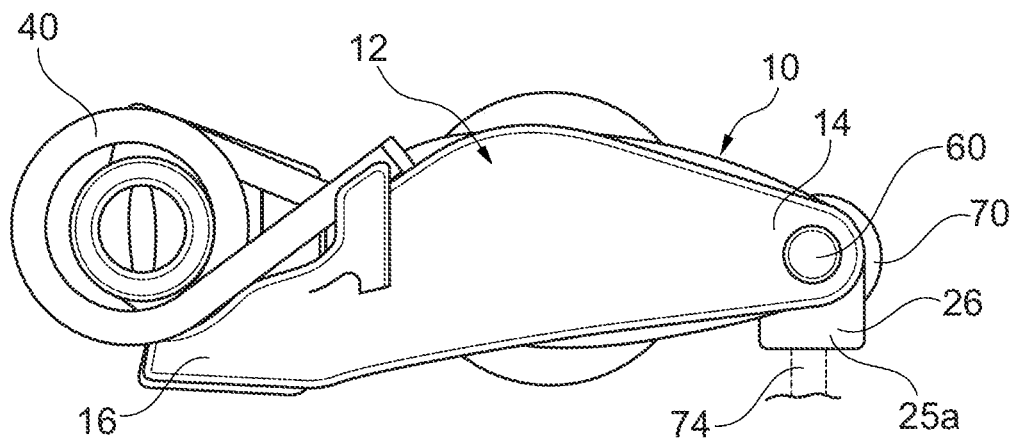
FIG. 3 is a side view of the first embodiment of the switchable roller finger follower.
Figure 4:
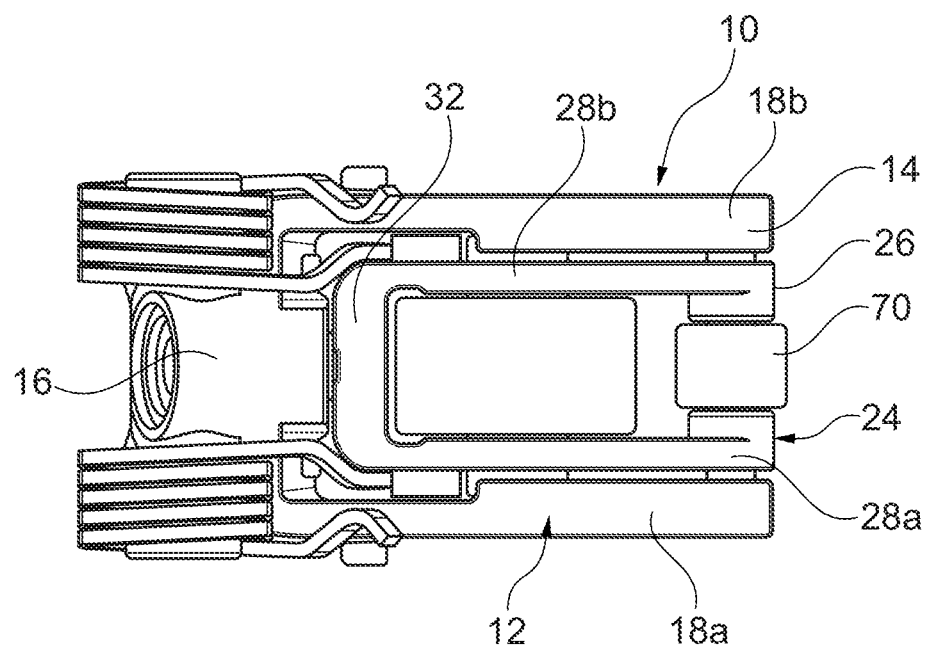
FIG. 4 is a top view of the first embodiment of the switchable roller finger follower.
Figure 5:
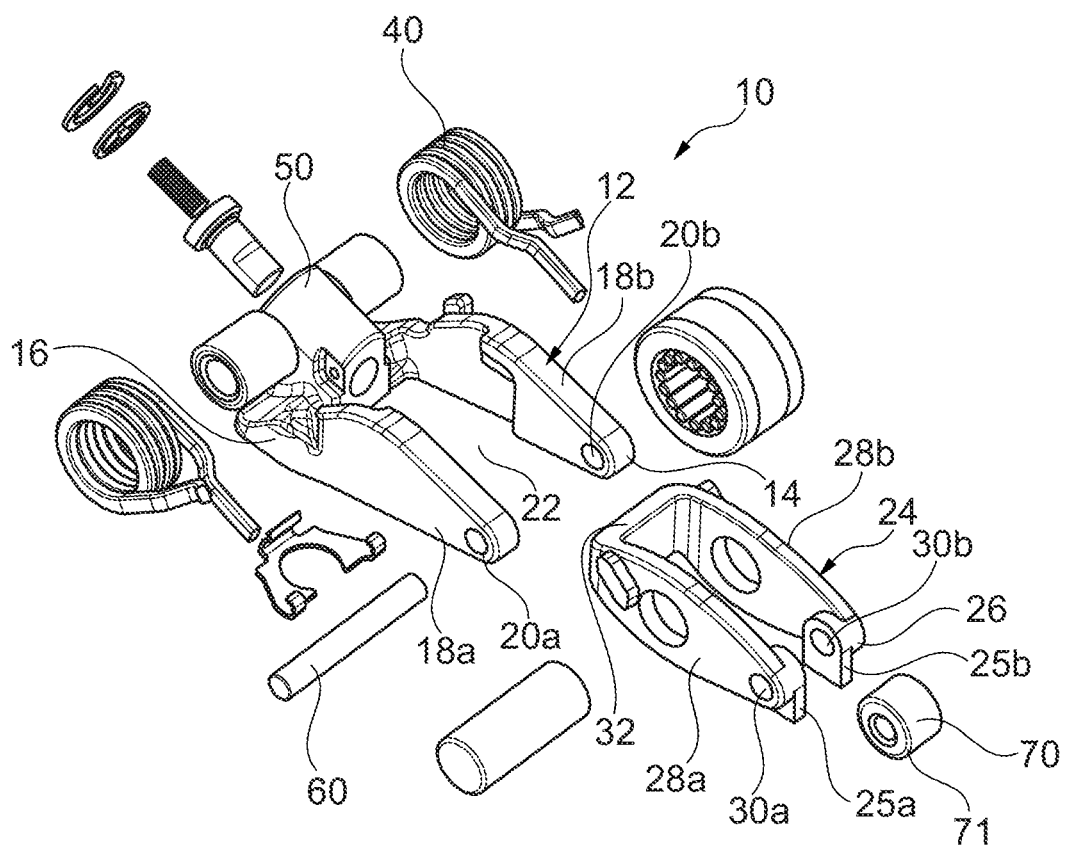
FIG. 5 is an exploded view of the first embodiment of the switchable roller finger follower.
Figure 6:
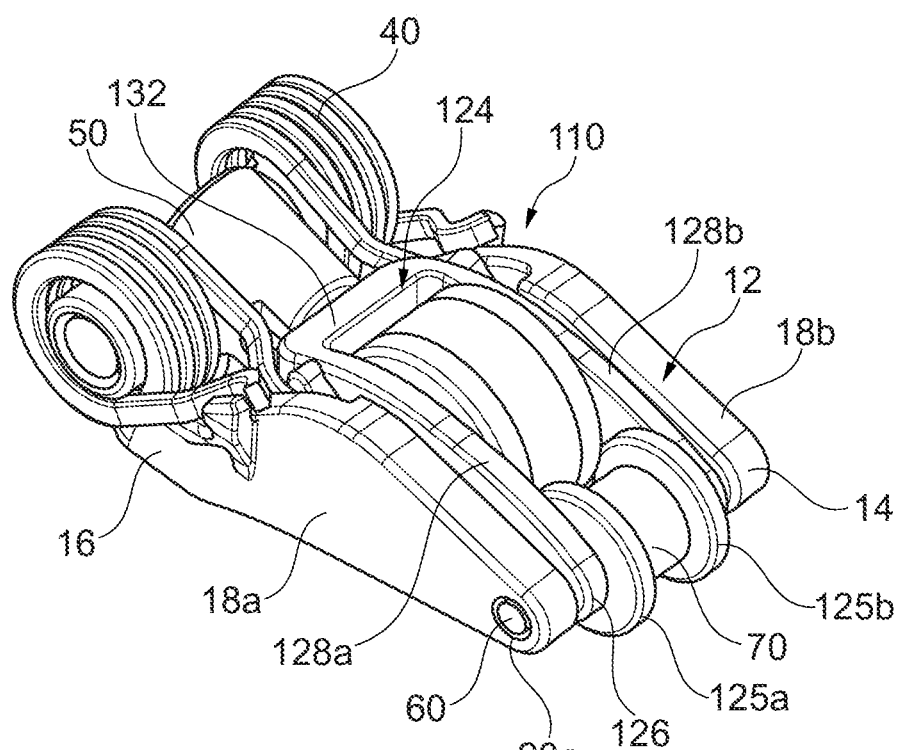
FIG. 6 is a top perspective view of a second embodiment of a switchable roller finger follower.
Figure 7:
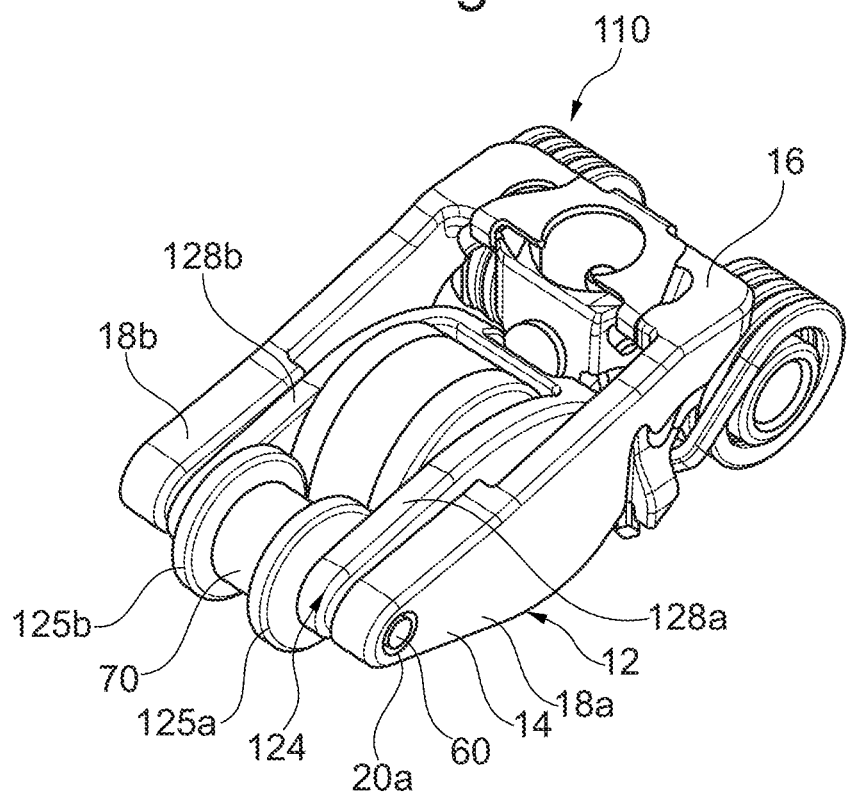
FIG. 7 is a rear perspective view of the second embodiment of the switchable roller finger follower.
Figure 8:
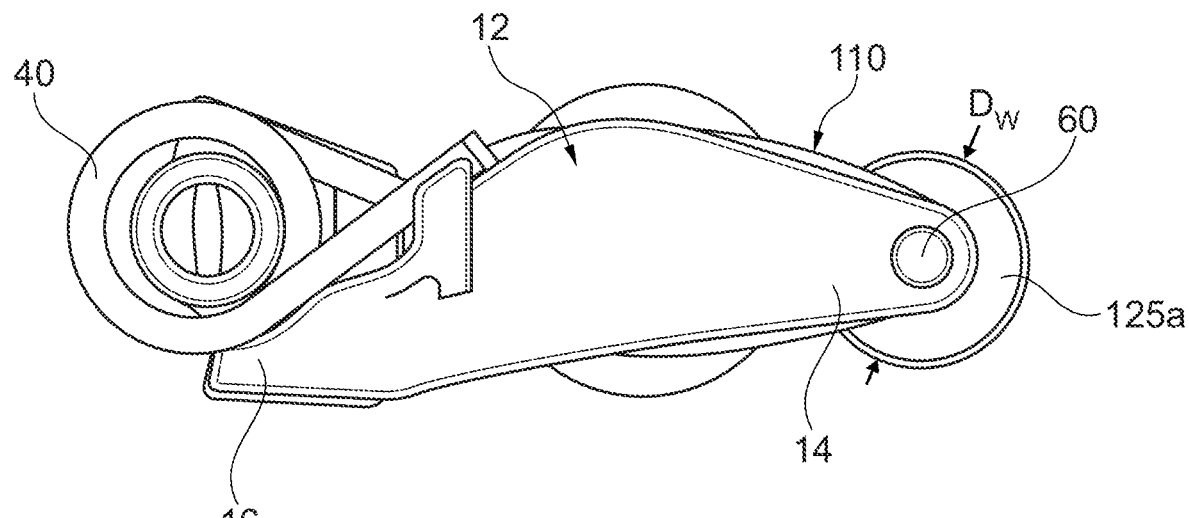
FIG. 8 is a side view of the second embodiment of the switchable roller finger follower.
Figure 9:
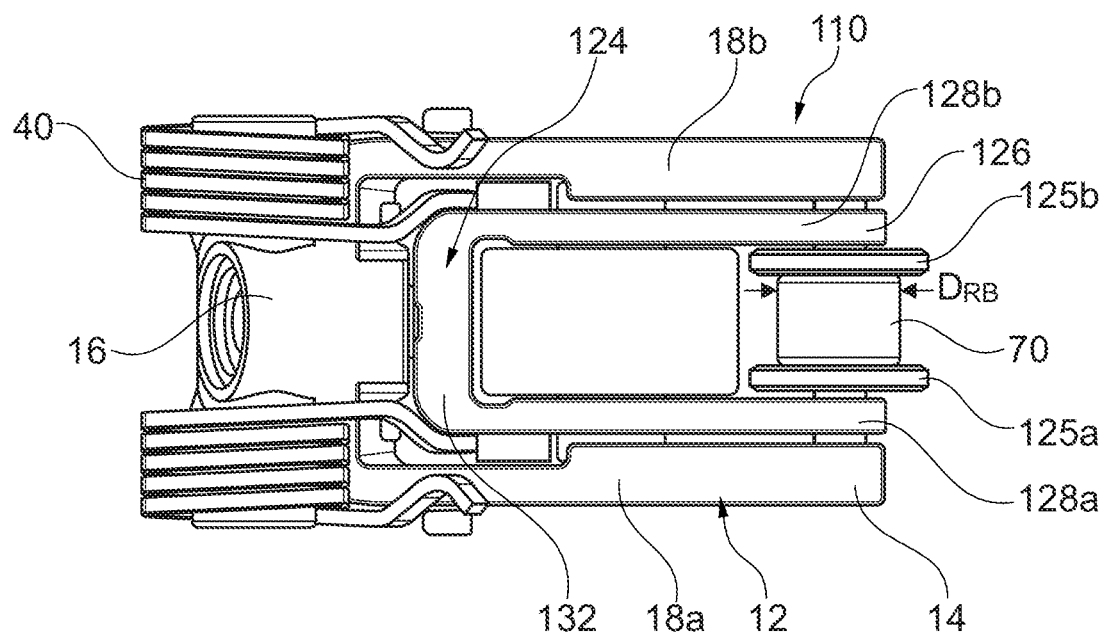
FIG. 9 is a top view of the second embodiment of the switchable roller finger follower.
Figure 10:
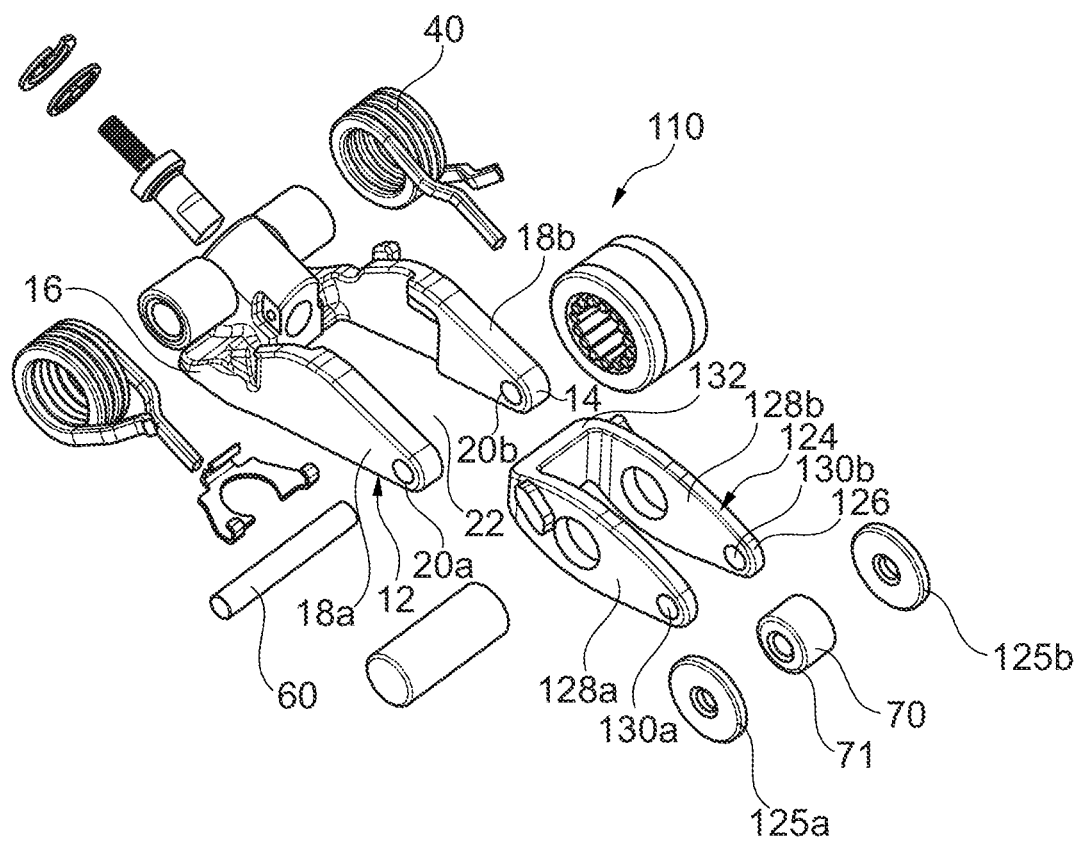
FIG. 10 is an exploded view of the second embodiment of the switchable roller finger follower.

As shown in FIGS. 1-10, a switchable roller finger follower 10, 110 is illustrated. FIGS. 1-5 illustrate a first embodiment of the switchable roller finger follower 10, and FIGS. 6-10 illustrate a second embodiment of the switchable roller finger follower 110. Identical elements are indicated in both sets of FIGS. 1-5 and FIGS. 6-10 with the same reference numeral unless explicitly identified with a different reference numeral.

The switchable roller finger follower 10 includes an outer body 12 having a valve stem end 14, a lash adjuster end 16, two arms 18a, 18b having first aligned holes 20a, 20b defined therein at the valve stem end 14, and an inner space 22 defined in the outer body 12 between the two arms 18a, 18b.

An inner body 24 is positioned in the inner space 22 of the outer body 12. The inner body 24 includes a first end 26 including two inner side walls 28a, 28b having second aligned holes 30a, 30b defined therein. The inner body 24 includes a second end 32 adjacent to the lash adjuster end 16 of the outer body 12.

A lost motion spring 40 is located between the inner body 24 and the outer body 12. A latching mechanism 50 selectively locks the inner body 24 in a fixed position relative to the outer body 12. The lost motion spring 40 and the latching mechanism 50 are well known to those of ordinary skill in the art, for example as disclosed in U.S. Pub. 2013/0186358, and are not described in more detail herein. An axle 60 extends through the first aligned holes 20a, 20b of the outer body 12 and the second aligned holes 30a, 30b of the inner body 24 to pivotally attach the inner body 24 to the outer body 12 at the valve stem end 14.

A rotatable body 70 is mounted on the axle 60 and located between the two inner sidewalls 28a, 28b. The rotatable body 70 is adapted to contact a valve stem 74, shown in broken lines in FIG. 3. The rotatable body 70 is preferably a sleeve. The rotatable body 70 is preferably a plain bearing. The rotatable body 70 can rotate freely about the axle 60 (i.e. the rotatably body 70 can rotate 360 degrees around the axle 60), and defines a valve stem contact surface around an entire circumference thereof. The rotatable body 70 is not limited in its rotation with respect to the axle 60 and, therefore, contact with the valve stem can occur at any circumferential location. Axial ends 71 of the rotatable body 70 preferably have tapered profiles. One of ordinary skill in the art would recognize from the present disclosure that the characteristics of the axle 60 can be modified.

In the first embodiment of FIGS. 1-5, the inner body 24 includes downwardly extending guides 25a, 25b projecting from the two inner side walls 28a, 28b, and the guides 25a, 25b are adapted to guide the valve stem. One of ordinary skill in the art would recognize from the present disclosure that other types of guides for the valve stem can be provided.

In the second embodiment of FIGS. 6-10, a pair of washers 125a, 125b are rotatably mounted on the axle 60 on both axial sides of the rotatable body 70, and the pair of washers 125a, 125b are adapted to guide the valve stem. The pair of washers 125a, 125b each define a first outer diameter (DW), and the rotatable body 70 defines a second outer diameter (DRB) that is smaller than the first outer diameter (DW). The washers 125a, 125b rotate while providing guidance for the valve stem to and facilitate even wear distribution. Although two types of guides have been identified herein, one of ordinary skill in the art would recognize from the present disclosure that alternative types of guides can be used. The embodiment of FIGS. 6-10 is otherwise similar to the embodiment of FIGS. 1-5 and includes an inner body 124, a first end 126, inner side walls 128a, 128b, second aligned holes 130a, 130b, and a second end 132.

Having thus described various embodiments of the present switchable roller finger follower in detail, it is to be appreciated and will be apparent to those skilled in the art that many changes, only a few of which are exemplified in the detailed description above, could be made in the finger follower without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS switchable roller finger followers 10, 110
outer body 12
valve stem end 14
a lash adjuster end 16
two arms 18a, 18b
first aligned holes 20a, 20b
inner space 22
inner body 24
guides 25a, 25b
first end 26
inner side walls 28a, 28b
second aligned holes 30a, 30b
second end 32
lost motion spring 40
latching mechanism 50
axle 60
rotatable body 70
axial ends 71 of the rotatable body
pair of washers 125a, 125b
outer diameter ($D_W$) of washers
outer diameter ($D_{RB}$) of rotatable body

What is claimed is:

1. A switchable roller finger follower comprising:
   an outer body having a valve stem end, a lash adjuster end, two arms having first aligned holes defined in the two arms at the valve stem end, and an inner space defined in the outer body between the two arms;
   an inner body positioned in the inner space of the outer body, the inner body having a first end including two inner side walls having second aligned holes defined in the two inner side walls, and a second end adjacent to the lash adjuster end of the outer body;
   a lost motion spring located between the inner body and the outer body;
   a latching mechanism to selectively lock the inner body in a fixed position relative to the outer body;
   an axle extending through the first aligned holes of the outer body and the second aligned holes of the inner body to pivotally attach the inner body to the outer body at the valve stem end;
   a rotatable body mounted on the axle and located between the two inner sidewalls, the rotatable body configured to freely rotate about the axle and the rotatable body being adapted to contact a valve stem along an entire circumference of the rotatable body; and
   a pair of washers freely rotatably mounted on the axle, wherein a first washer of the pair of washers is mounted on a first axial side of the rotatable body and a second washer of the pair of washers is mounted on a second axial side of the rotatable body, and the pair of washers are adapted to guide the valve stem.

2. The switchable roller finger follower of claim 1, wherein the pair of washers each define a first outer diameter, and the rotatable body defines a second outer diameter that is smaller than the first outer diameter.

3. The switchable roller finger follower of claim 1, wherein axial ends of the rotatable body have tapered profiles.

4. The switchable roller finger follower of claim 1, wherein the rotatable body is a sleeve.

5. The switchable roller finger follower of claim 1, wherein the rotatable body is a plain bearing.

6. The switchable roller finger follower of claim 1, wherein the rotatable body is axially wider than each one of the two inner side walls and each one of the two arms.

7. The switchable roller finger follower of claim 1, wherein the pair of washers each have a constant circular outer surface.

* * * * *